March 2, 1943.  C. A. NICHOLS ET AL  2,312,845
WIRE FEEDING APPARATUS
Filed Jan. 30, 1941    13 Sheets-Sheet 1

Inventors
Charles A. Nichols
and Ernest R. Fausset
by Spencer Hardman & Fehr
their Attorneys

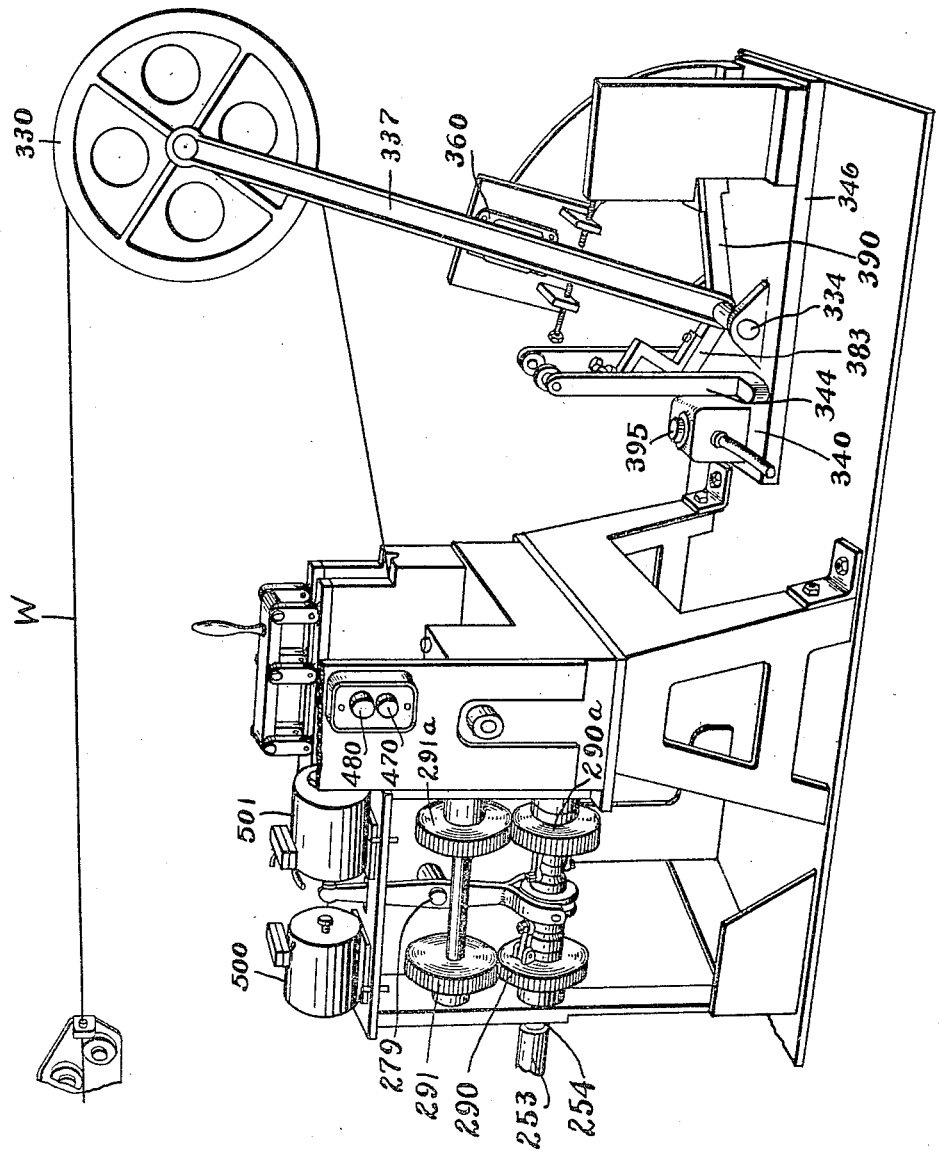

March 2, 1943.  C. A. NICHOLS ET AL  2,312,845
WIRE FEEDING APPARATUS
Filed Jan. 30, 1941  13 Sheets-Sheet 3
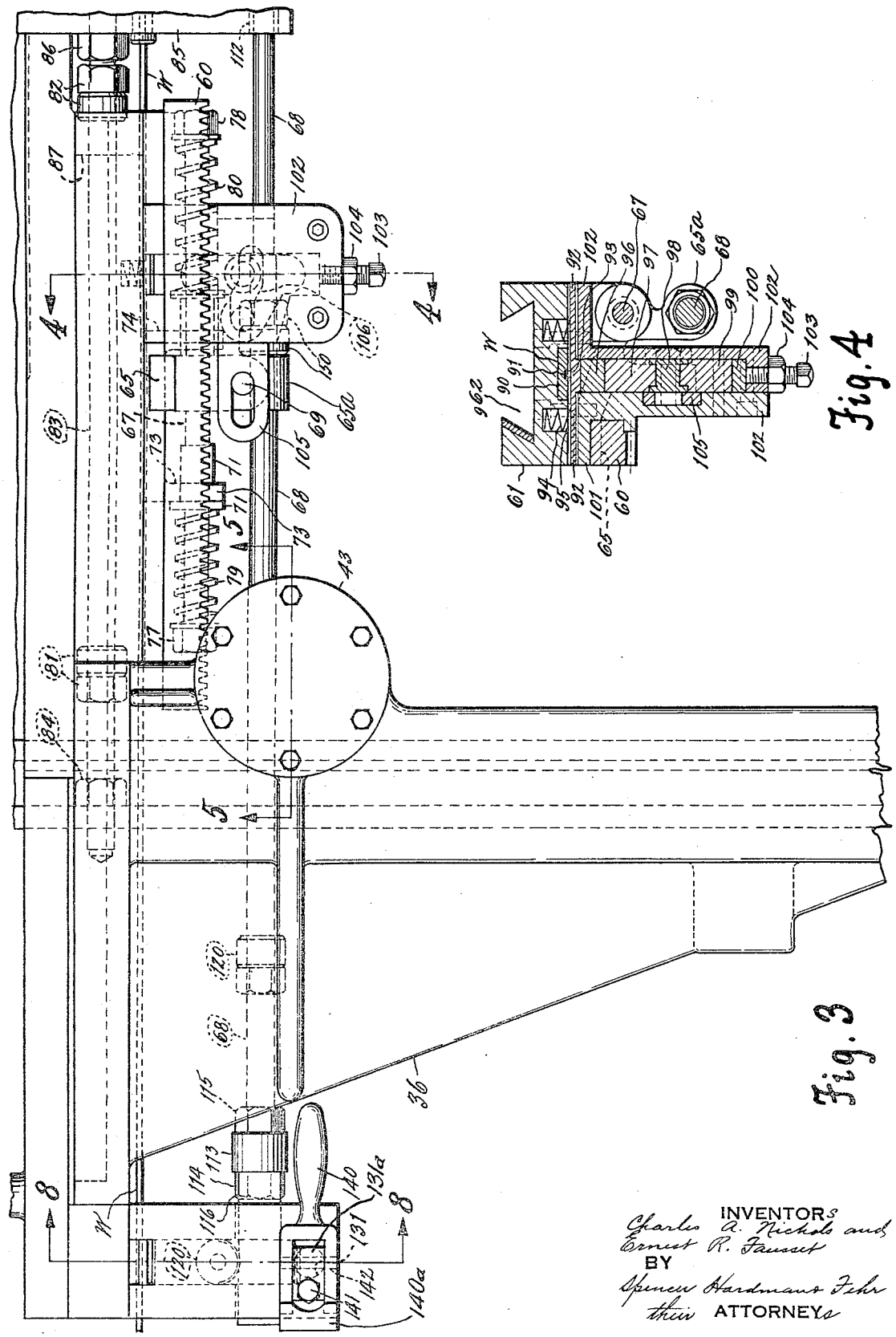

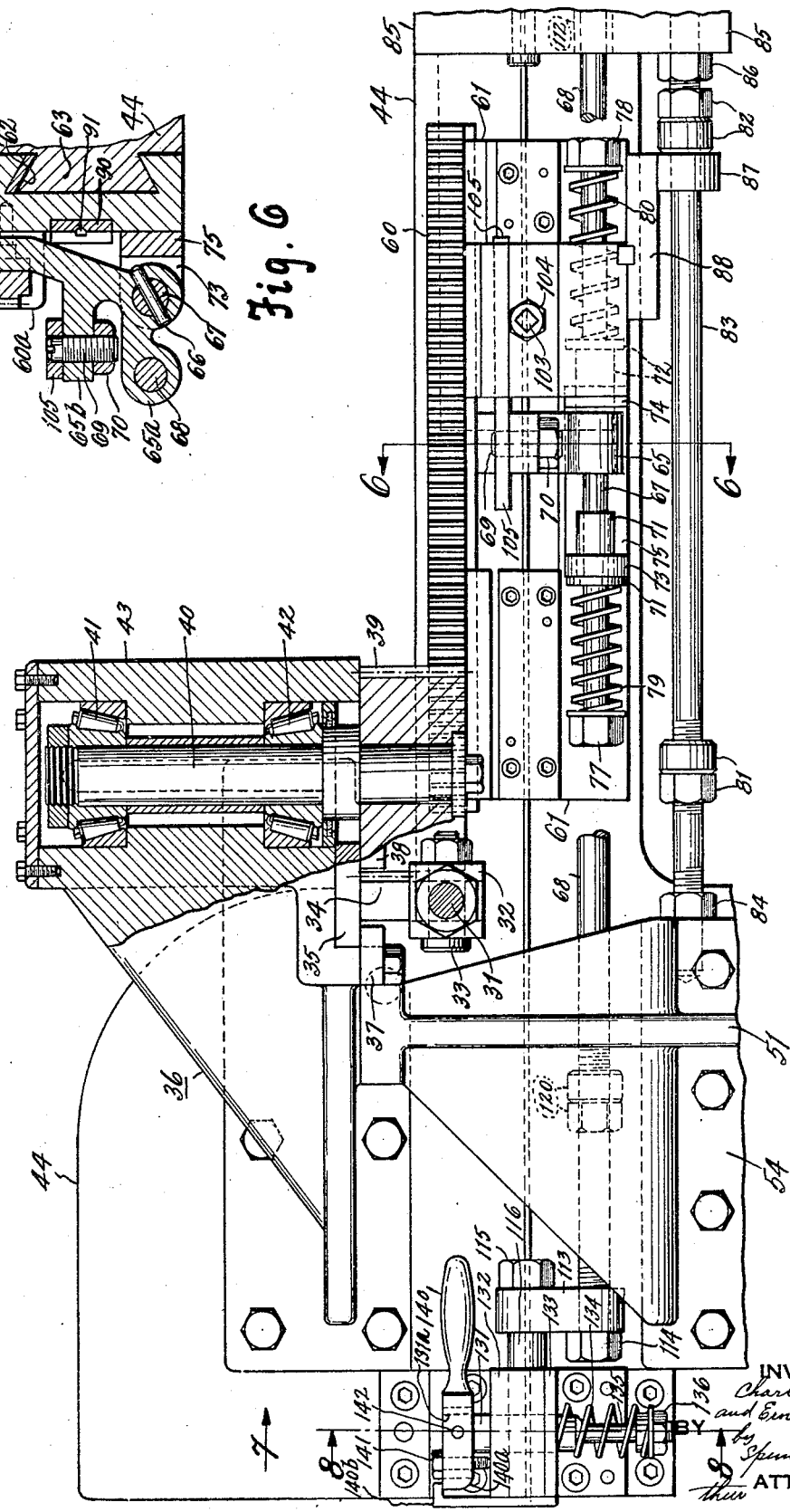

March 2, 1943.  C. A. NICHOLS ET AL  2,312,845
WIRE FEEDING APPARATUS
Filed Jan. 30, 1941  13 Sheets-Sheet 5
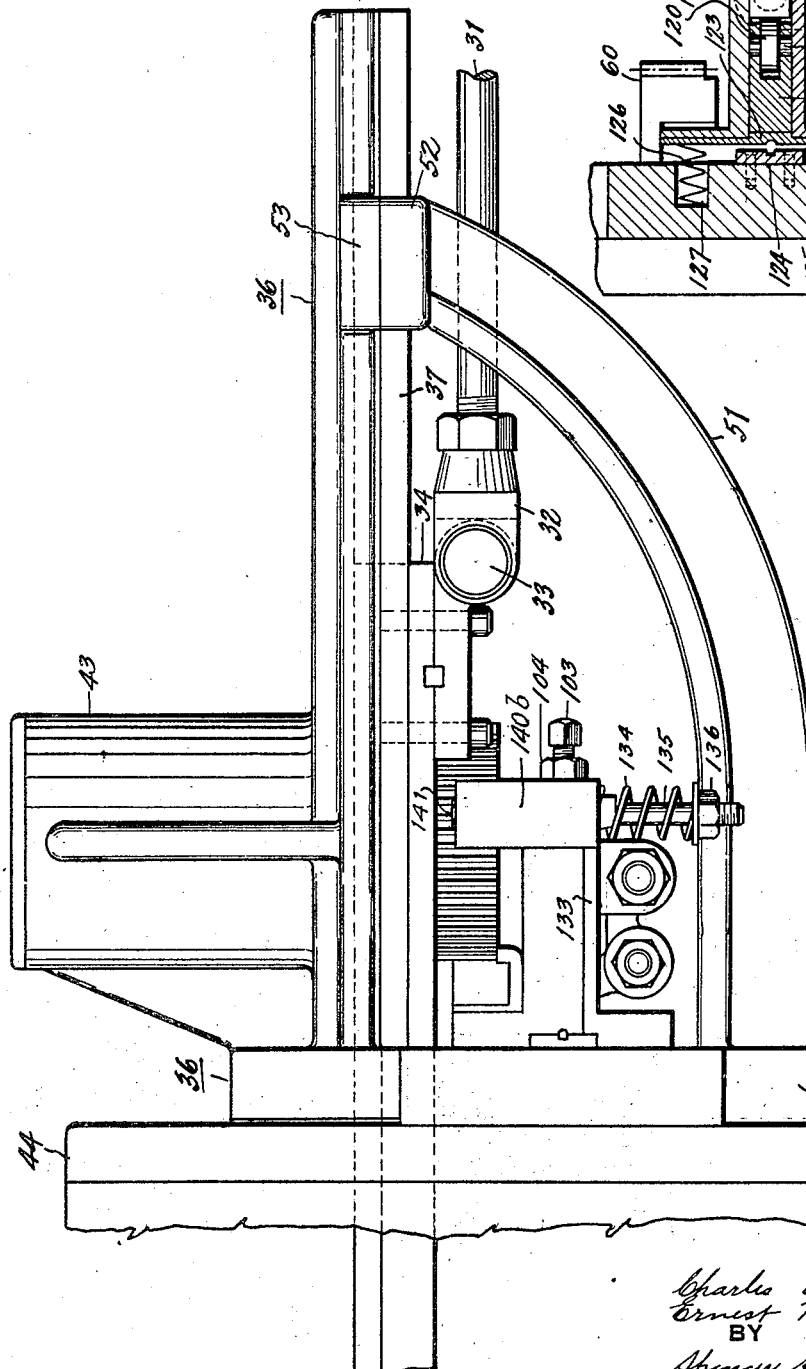

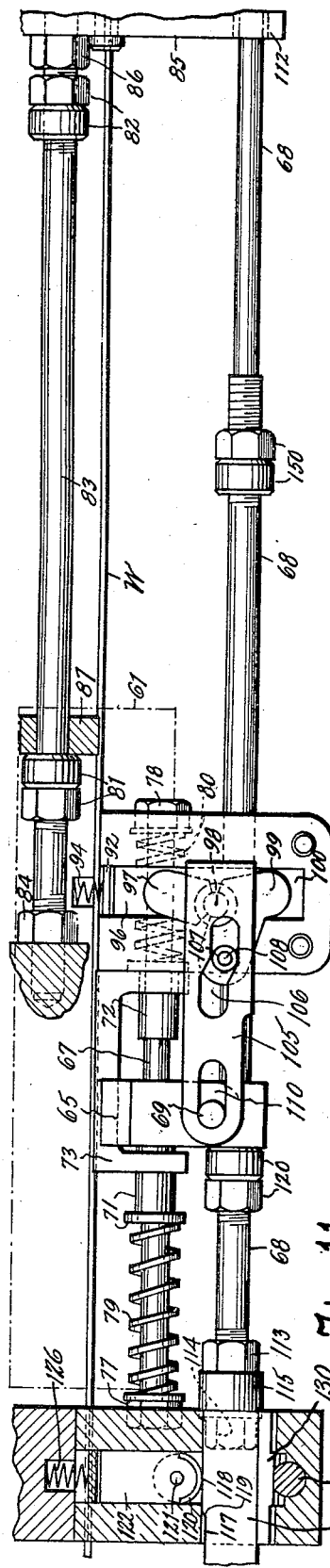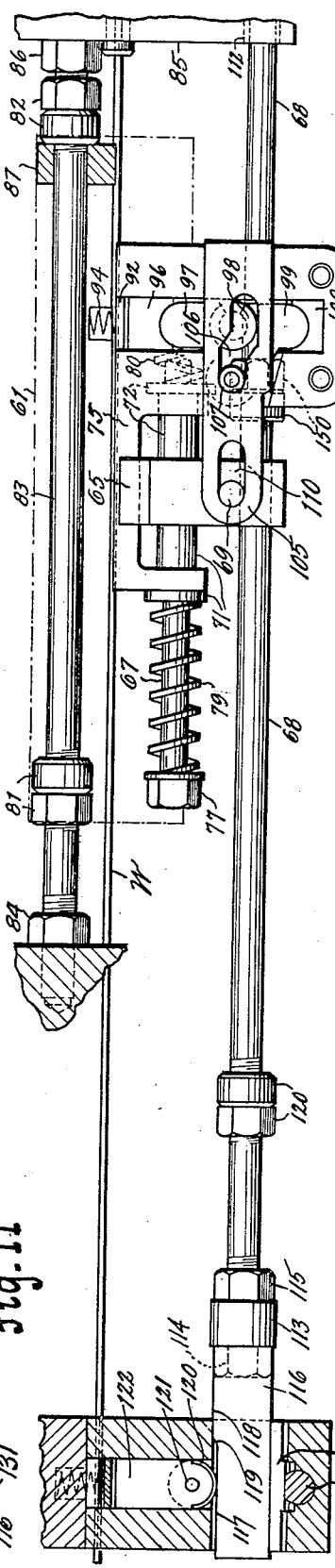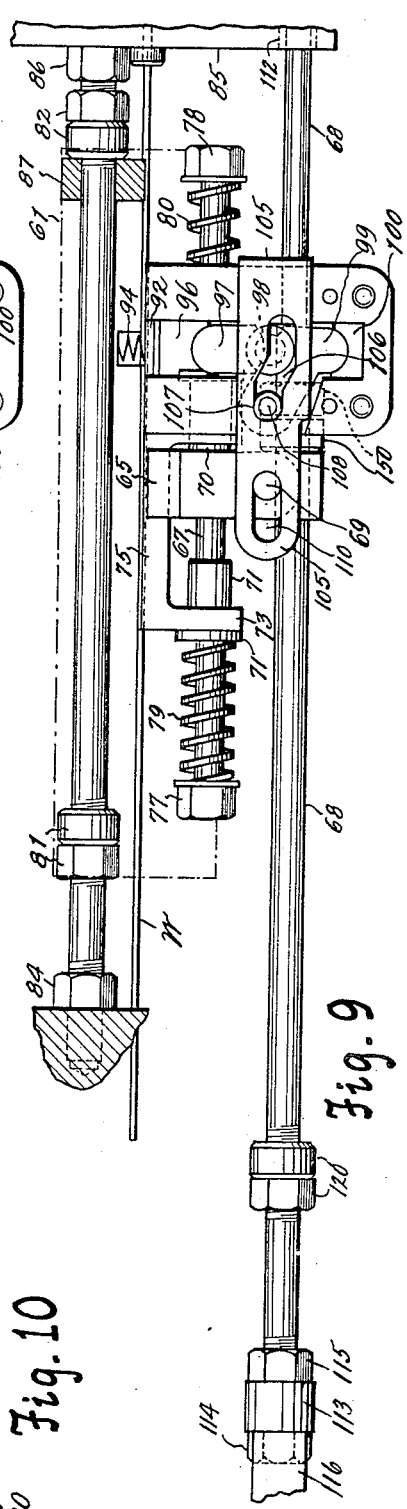

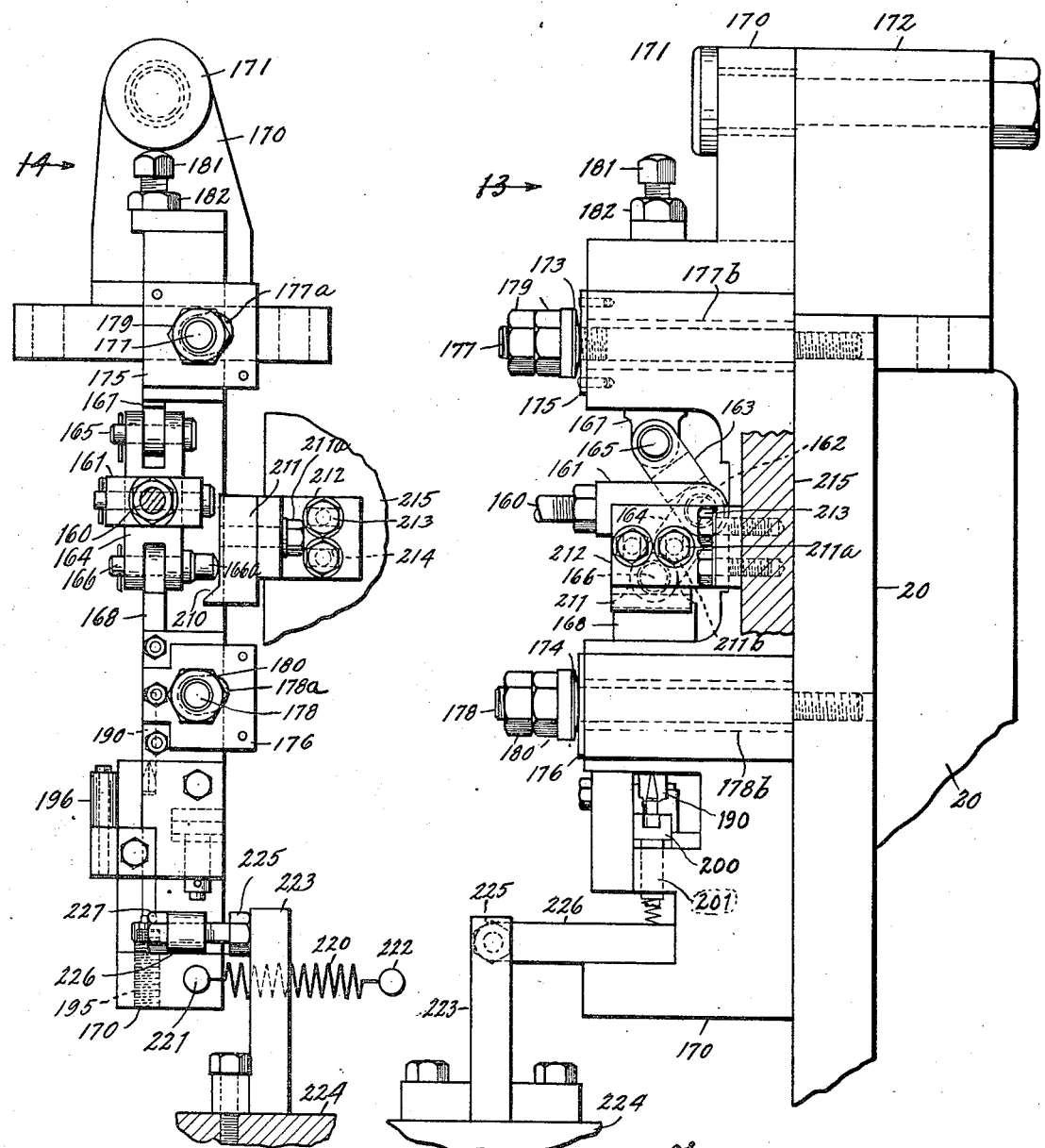

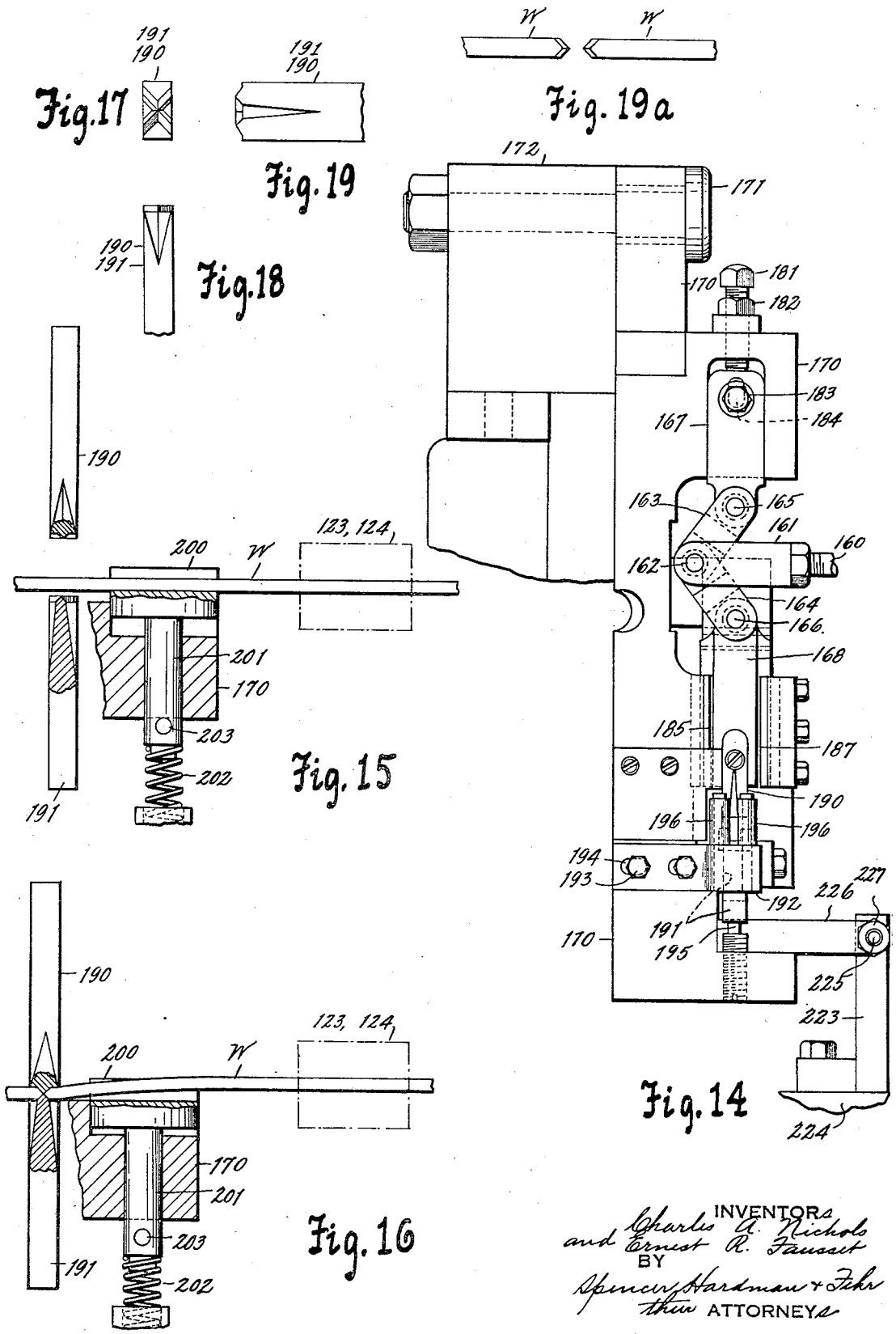

March 2, 1943.  C. A. NICHOLS ET AL  2,312,845
WIRE FEEDING APPARATUS
Filed Jan. 30, 1941   13 Sheets-Sheet 9

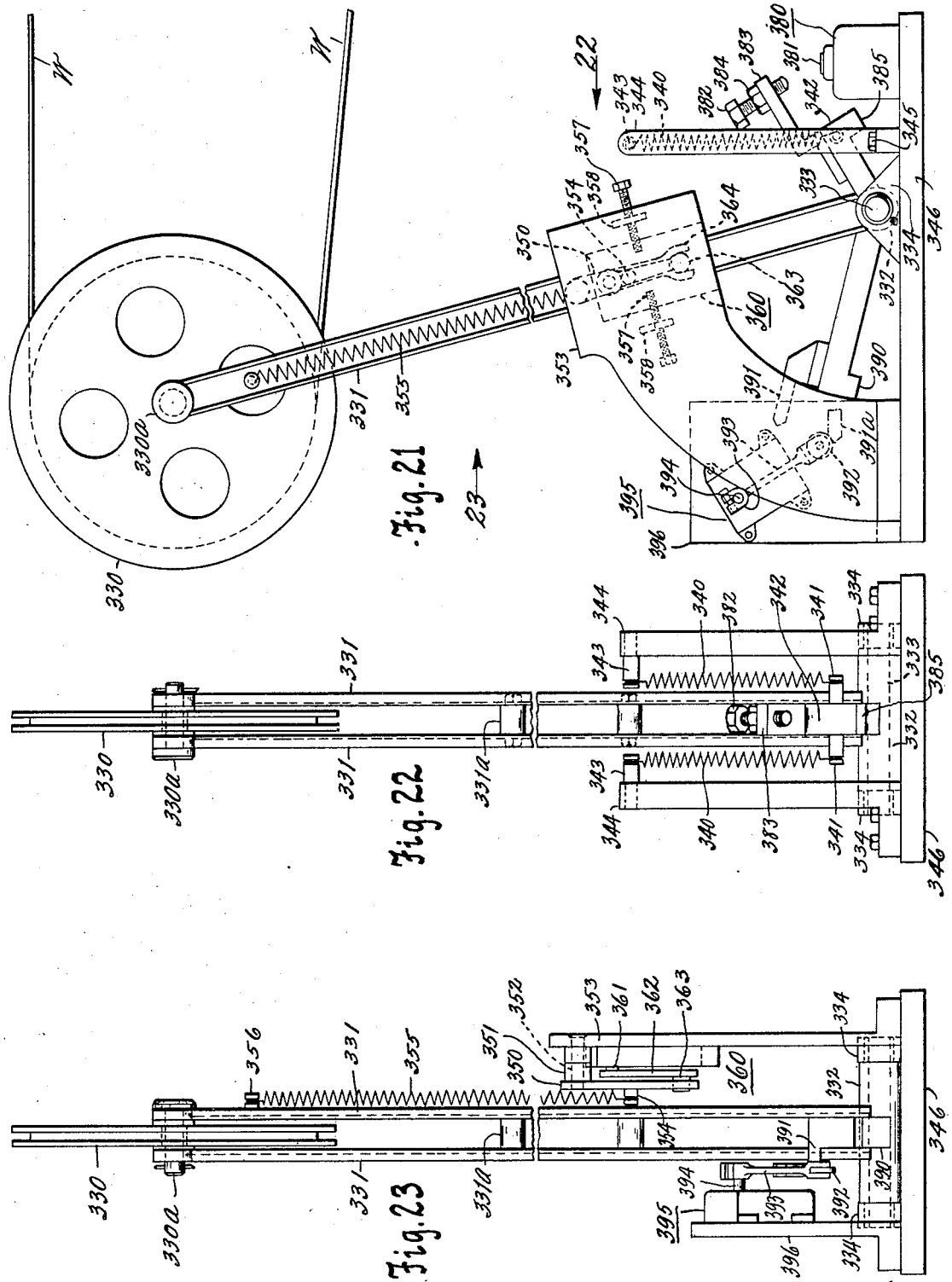

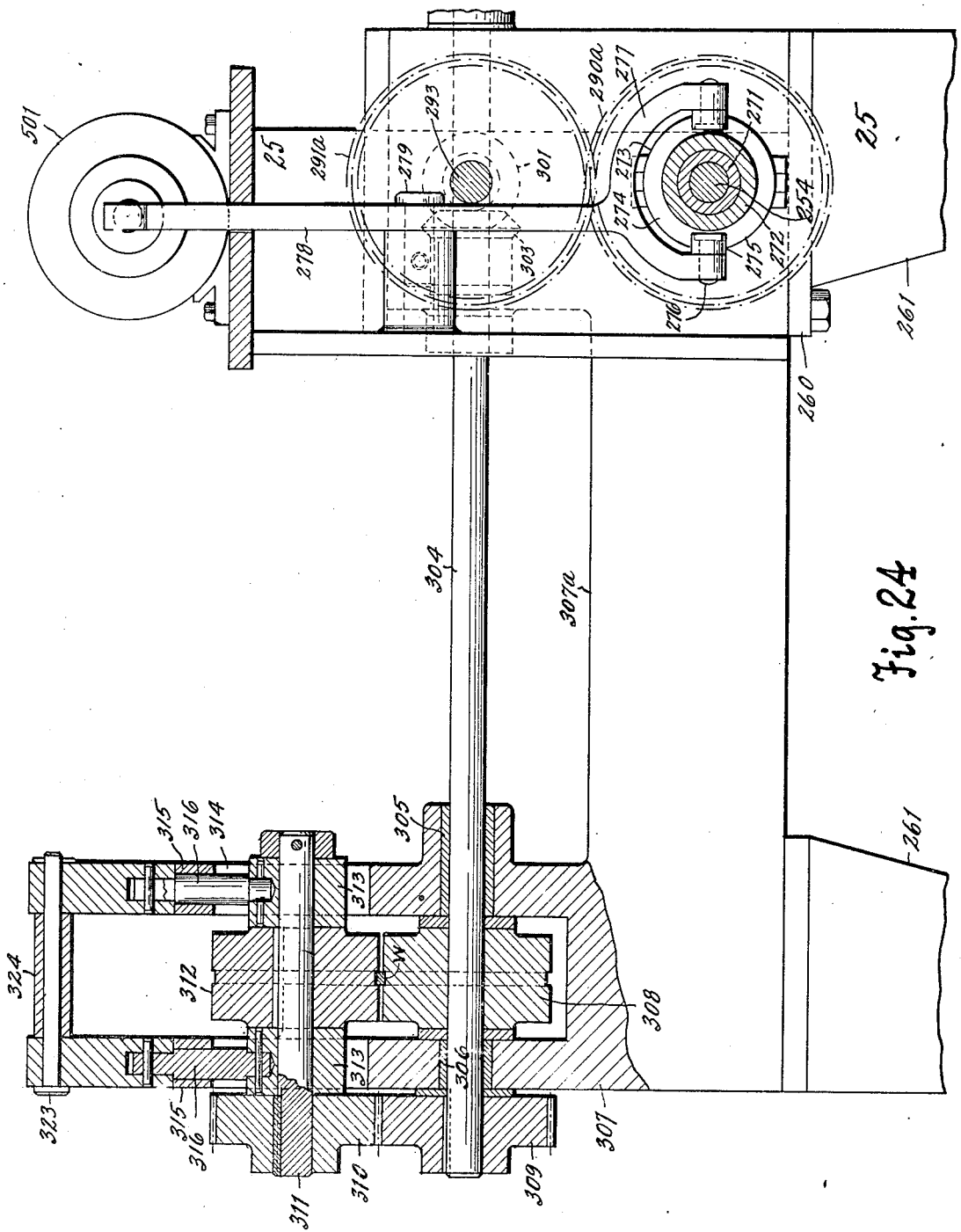

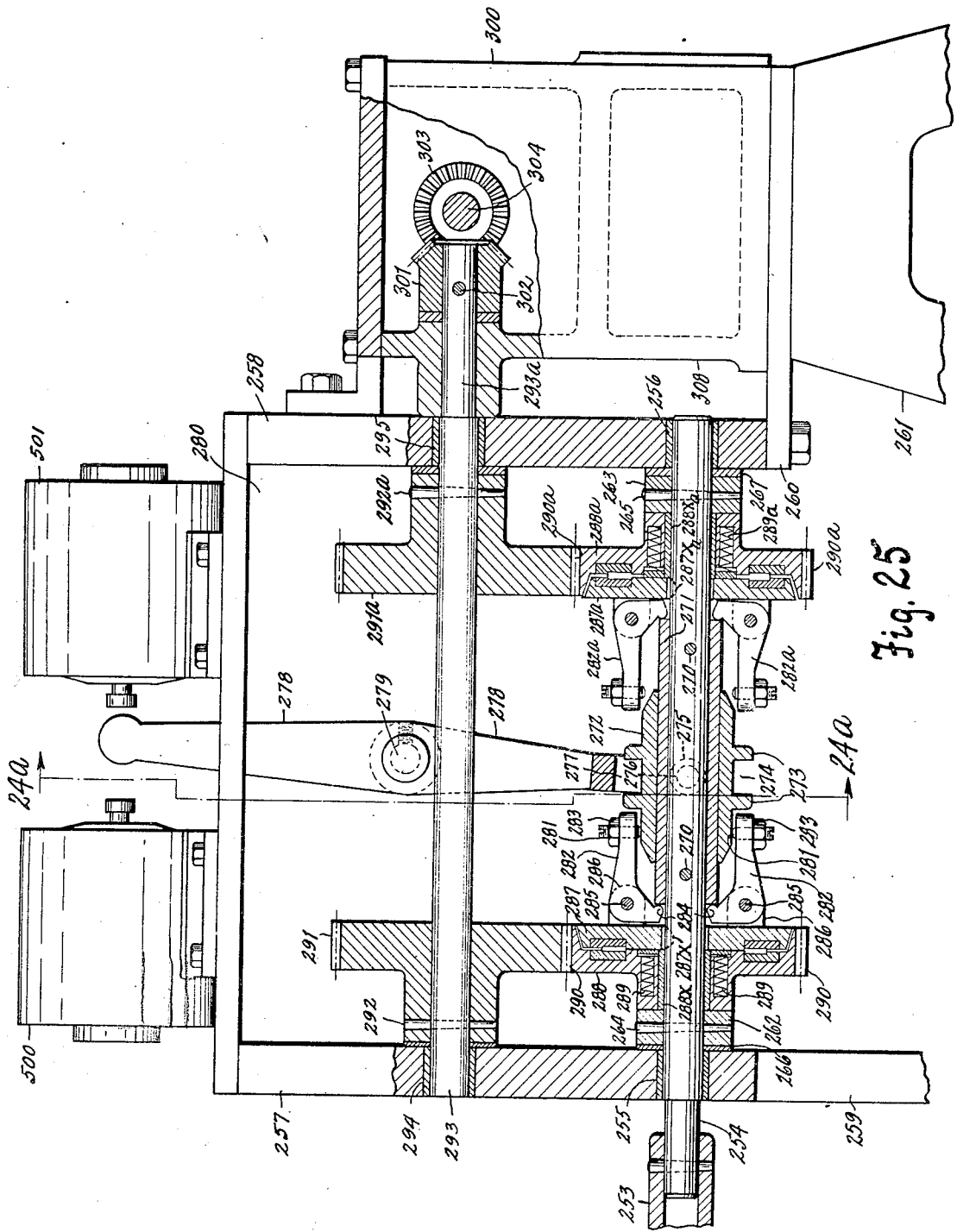

March 2, 1943. C. A. NICHOLS ET AL 2,312,845
WIRE FEEDING APPARATUS
Filed Jan. 30, 1941 13 Sheets-Sheet 13

Inventors
Charles A. Nichols
and
Ernest R. Fausset
by Spencer Hardman & Fehr
their Attorneys Patented Mar. 2, 1943

2,312,845

UNITED STATES PATENT OFFICE 2,312,845

WIRE FEEDING APPARATUS

Charles A. Nichols and Ernest R. Fausset, Anderson, Ind., assignors to General Motors Corporation, Detroit, Mich., a corporation of Delaware Application January 30, 1941, Serial No. 376,676

15 Claims. (Cl. 153—6)

This invention relates to the manufacture of single turn bar windings known as hairpins used in the manufacture of dynamoelectric machines, more particularly in the manufacture of armatures for series electric motors used in starting combustion engines.

In L. E. Poole's Patent No. 1,834,733, issued Dec. 1, 1931, there is disclosed a machine for making hairpins from flat wire which is fed to the machine from a supply reel. One of the objects of the present invention is to secure greater uniformity in the lengths of the legs or branches of the hairpins. According to former practice, the hairpins were assembled with the armature core by hand; and it did not matter if the hairpin legs were not absolutely equal in length. In order that the hairpins may be assembled by a machine such as that disclosed in the copending application of Poole and Fausset, Serial No. 366,456, filed Nov. 20, 1940, it is necessary that the legs be of the same length.

It is therefore more particularly an object of the present invention to provide for feeding the wire uniformly and to provide for clamping the wire in fixed position after having been fed so that there will be absolutely no slippage of the wire with respect to the forming mechanism while the feeding mechanism is retracting. It is also an object of the present invention to prevent the buckling of the wire particularly between the device for clamping the wire and the device for severing the wire into a length suitable for forming of the hairpin.

Poole Patent No. 1,834,733 discloses the use of straightening rolls between which the wire passes before being gripped by the feeding mechanism. Straightening rolls are associated with the feeding mechanism of the present invention. It is a further object of the present invention to maintain the wire as straight as possible before it enters between the straightening rolls. To accomplish this object we provide means for feeding the wire to the straightening rolls from the supply reel at a speed which is maintained substantially uniform within close limits by a power driven feeding mechanism, the speed of which is controlled by a wire tensioning guide wheel around which the wire passes while moving from the feed rolls to the straightening rolls. In connection with this object it is a further object to provide automatic means for controlling the speed of the wire feeding device in accordance with position of the wire tensioning guide wheel within certain limits.

A further object of the invention is to provide for automatically stopping the hairpin forming press in case the slack of wire between the feed rolls adjacent the supply wheel and the straightening rolls of the forming press becomes less or greater than predetermined limits. In case of failure to unwind the wire from the supply reel, then the feeding of the wire from the supply reel by the feed rolls would not keep pace with the consumption of wire by the hairpin press. Then the slack will diminish below a certain limit and the machine will automatically stop. In case of failure of the press feeding mechanism to keep pace with the wire feeding mechanism adjacent the supply reel, the slack between the feed rolls and the stretching rolls of the punch will exceed a certain limit and the machine will automatically stop. In case of buckling of the wire between the straightening rolls and the feeding mechanism of the forming press the press will automatically stop.

The Poole and Fausset application No. 366,456 discloses a machine for assembling hairpins with an armature core. The hairpins formed by the press disclosed in this application are conveyed, as they are formed, to the magazine of the assembling machine. This hairpin magazine is associated with a delivery chute having a window thru which the rays of an incandescent lamp shine upon a photoelectric cell for the purpose of effecting control of the hairpin forming press. When this chute is full of hairpins the passage of rays thru the window of the chute is blocked by the hairpin legs. Then the punch press stops producing any more hairpins until a sufficient number have been consumed by the assembling machine to cause the chute window to be unblocked. Obviously the photoelectric cell is operative to cause the machine to start if the rays of a lamp shine upon it; and the machine will stop if the lamp is turned off. In the system of control of the present invention we provide for manually turning on and off the lamp which affects the photoelectric cell and for automatically turning off the lamp when the slack of the wire between the feed rolls associated with the supply reel and the straightening rolls associated with the hairpin forming press falls below a certain low tolerable limit or exceeds a certain high tolerable limit. The lamp is also automatically turned off when there is buckling of the wire adjacent the feeding mechanism of the forming press.

Further objects and advantages of the present invention will be apparent from the following description, reference being had to the accompanying drawings wherein a preferred embodiment of the invention is clearly shown.

In the drawings:

Fig. 2 is a perspective view of the wire feeding mechanism associated with the supply reel shown at the right in Fig. 1, and the controls, including a switch governed by the wire tensioning guide wheel shown at the right in Fig. 2.

Fig. 3 is a fragmentary plan view of the hairpin forming press.

Fig. 4 is a sectional view on the line 4—4 of Fig. 3.

Fig. 5 is a front elevation of the wire feeding mechanism of the forming press, certain parts being shown in section taken on the line 5—5 of Fig. 3.

Fig. 6 is a sectional view on the line 6—6 of Fig. 5.

Fig. 7 is an end elevation located in the direction of the arrow 7 of Fig. 5.

Fig. 8 is a sectional view on the line 8—8 of Fig. 3.

Fig. 9 is a diagrammatic view including plan views of certain parts of the feeding mechanism of the forming press. Fig. 9 shows parts in position corresponding to those shown in Fig. 4.

Fig. 10 is a view similar to Fig. 9 showing certain parts in a slightly different position after movement of the wire feed operating member toward the left has begun.

Fig. 11 is a view similar to Figs. 9 and 10, showing the location of various parts of the wire feeding and wire clamping mechanisms after the feed operating member has moved to its left-hand position.

Fig. 12 is an end elevation of the wire severing mechanism and mounting therefor; and is a view looking in the direction of the arrow 12 of Fig. 1. The head of arrow 12 points to the upper portion of the mounting for the wire severing mechanism which appears in Fig. 12.

Fig. 13 is a view looking in the direction of the arrow 13 of Fig. 12.

Fig. 14 is a view looking in the direction of the arrow 14 of Fig. 13.

Figs. 15 and 16 are diagrammatic views showing the relation of the wire cutting punches to the wire clamping mechanism in the different positions of the former.

Figs. 17, 18 and 19 are top, end and side views respectively of one of the wire severing punches.

Fig. 19a shows the pointed and bevelled portions of the severed wire.

Figure 20:
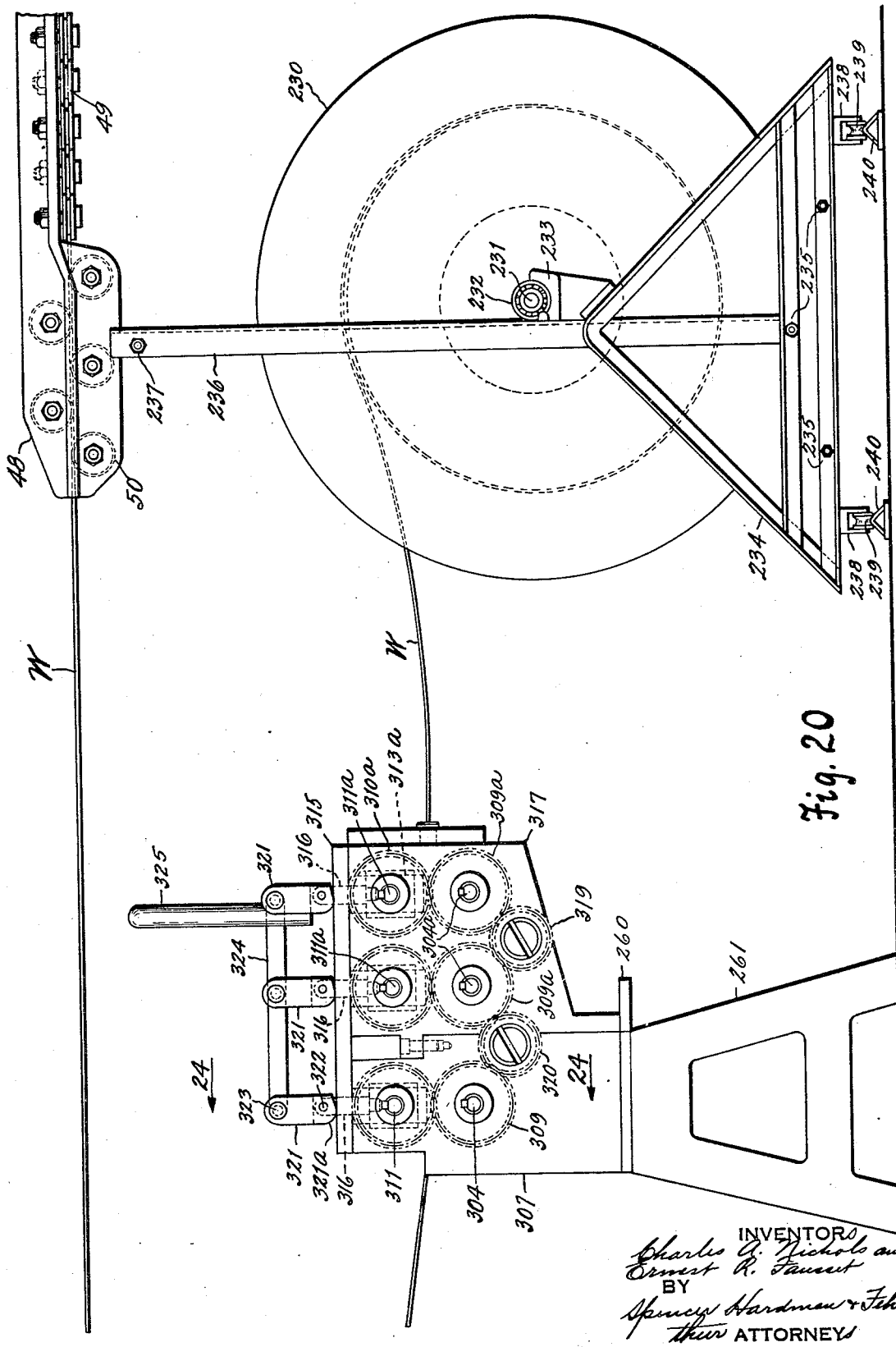

Figs. 20 and 21 taken together constitute a side elevation of the mechanism for feeding and guiding wire from the supply reel to the straightening reels of the forming press and for maintaining a certain tension on the wire.

Fig. 22 is a view looking in the direction of the arrow 22 in Fig. 21.

Fig. 23 is a view looking in the direction of the arrow 23 in Fig. 21.

Fig. 24 is a view partly in section and partly in elevation of the wire feeding mechanism associated with the wire supply reel of Fig. 20. The sectional part at the left hand of Fig. 24 is taken approximately on the line 24—24 of Fig. 20. The sectional part of Fig. 24 at the right hand thereof is taken approximately on the line 24a—24a of Fig. 25.

Fig. 25 is a sectional view taken approximately on the line 25—25 of Fig. 24.

Figure 26:
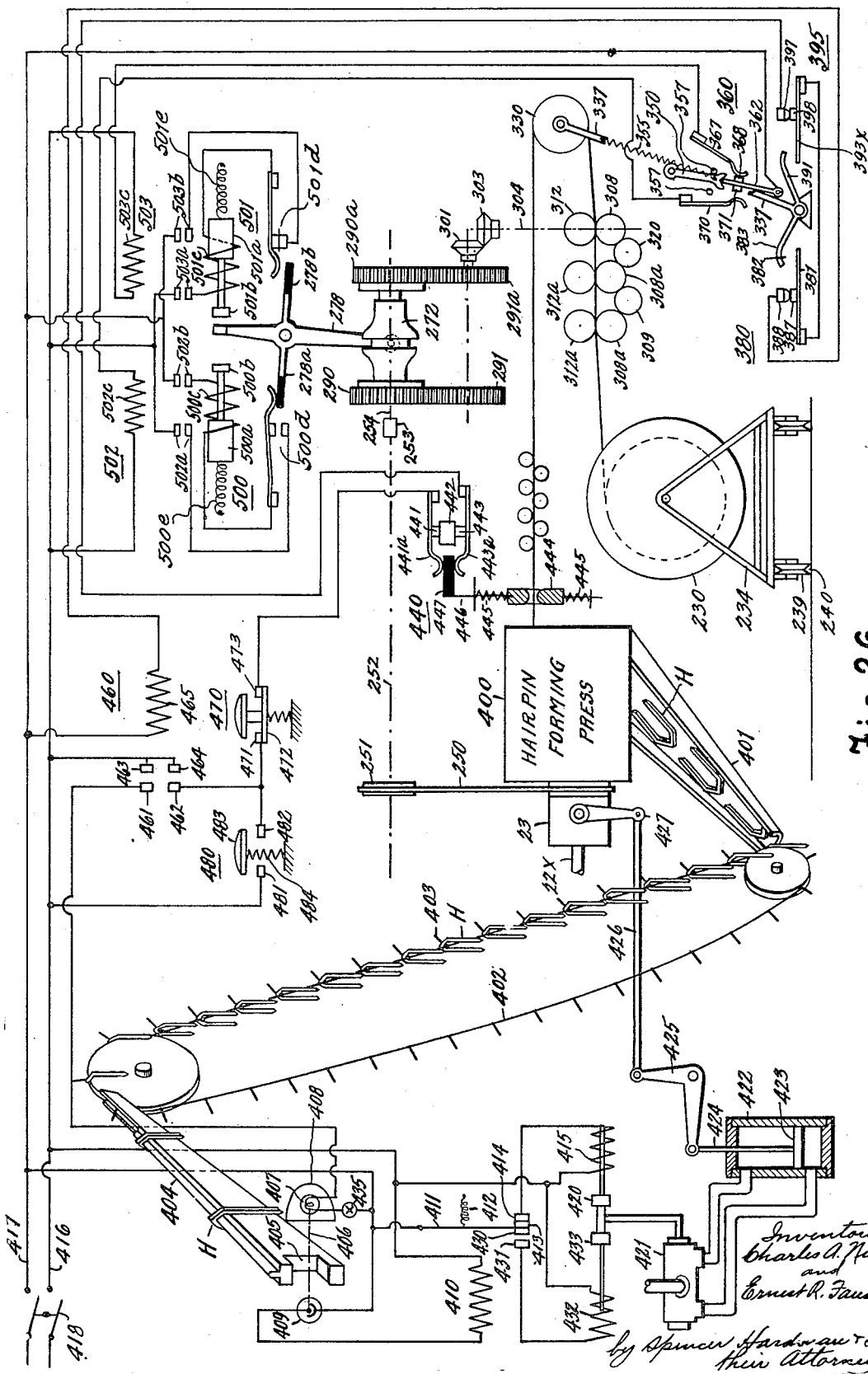

Fig. 26 is a diagram of the controls of a hairpin forming press and of the wire feeding mechanism associated with the supply reel.

*Wire feeding mechanism of the hairpin forming press*

Figure 1:
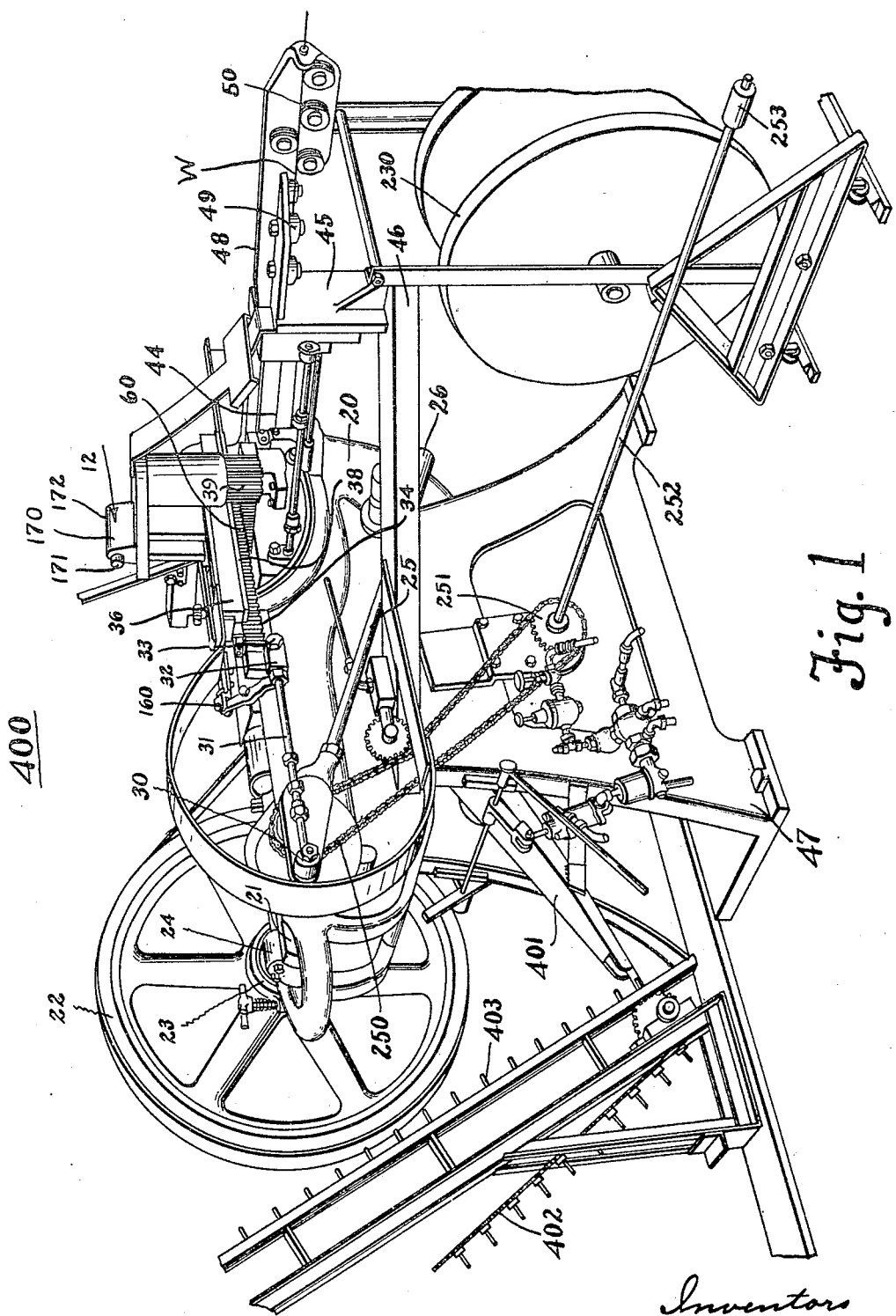
Fig. 1 is a perspective view of the hairpin forming press equipped with the wire feeding mechanism embodying the present invention.

Referring to Fig. 1, the press frame 20 supports a crankshaft 21 upon which is mounted a power driven flywheel 22 connected with the crankshaft 21 thru a clutch 23. The crank cooperates with connecting rod 24 for operating one of the movable dies of the hairpin forming press. The crankshaft 21 cooperates with a rod 25 and a lever 26 for operating another movable die of the hairpin forming mechanism. For further disclosure of the hairpin forming dies and their operating mechanism, reference is made to Poole, 1,834,733.

With the mechanism for operating the hairpin forming dies there is coordinated the mechanism for feeding the wire to these dies. This mechanism comprises an arm 30 operated by shaft 21 and connected by a rod 31, a clevis 32 and a pin 33 (also Fig. 5) with a rack 34 supported by bar 35 slidable in ways provided by a frame 36 and plates 37 and 38. Rack 34 meshes with a pinion 39 fixed to a shaft 40 which is journalled in tapered roller bearings 41 and 42 supported by a housing 43 integral with the frame 36. The frame 36 (Figs. 5 and 7) is attached to a plate 44 which extends from the press frame 20 toward the right in Fig. 1 and which is supported at its right end by bracket 45 resting upon a channel bar 46 attached at its left end to one of the leg frames 47 of the press, thus providing a rigid structure for supporting the wire feeding mechanism and also for supporting a frame 48 carrying a horizontal group of straightening rolls 49 and a vertical group of straightening rolls 50 between which the wire W passes before being engaged by the wire feeding device. As the bracket 36 overhangs the plate 44 a substantial distance toward the right in Fig. 7 it is braced by a bracket 51 having a pad 52 for supporting a pad 53 of the frame 36 and having a pad 5 attached to the plate 44.

The rack 39, Figs. 5 and 6, meshes with a rack 60 floatingly supported by brackets 60a attached to a feed slide 61 having a dovetailed groove 62 for engaging a similarly shaped guide plate 63 provided by the plate 44. The back side of the rack 60 is provided with a notch 64 for receiving an arm 65 attached by pin 66 to a rod 67. An extension 65a of arm 65 is apertured to receive a rod 68. An extension 65b of arm 65 receives a screw stud 69 locked by a nut 70. Stud 69 cooperates with a cam plate 105 to be described. The rod 67 extends thru flanged bushings 71 and 72, Fig. 5, said bushings being slidably supported by ears 73 and 74, respectively, of a bracket 75 attached to slide 61, Fig. 6. Ends of the rod 67 receive nuts 77 and 78, respectively, which confine, under compression, springs 79 and 80, respectively, thereby urging the flanges of the bushings 71 and 72 against the ears 73 and 74, respectively, of the bracket 75. When the arm 65 stands in the position shown in Fig. 10, the flanges of the bushings 71 and 72 will actually engage the ears 73 and 74, respectively, of the bracket 75. This position of the arm 65 shown in Fig. 10 will be known hereafter as the mid-position or normal position. The amount of motion transmitted to the rack 60 is in excess of that required for feeding the wire W. The extent of movement of the slide 61 is determined by the location of pairs of nuts 81 and 82 threadedly adjustable on a rod 83 which is threadedly received at its left end by the bracket 54 and is locked by a nut 84, and which is threadedly received at its right end by a plate 85 (attached to plate 44) and locked there by a nut 86. In the space between the pair of nuts 81 and 82 an apertured lug 87 receiving rod 83 is free to move, its movement being limited by the dimensions of this space. The lug 87 is integral with a bracket 88 attached to the slide 61. When the rack 60 travels to the right a distance greater than that necessary to move the lug 87 against nuts 82, the arm 65 driven by the rack 60 will move into the position shown in Figs. 5 and 9 in which it becomes separated from the bushings 71 and forces the nut 77 toward the right further to compress the spring 79. This movement of the rack toward the right beyond movement of the slide 61 toward the right will be called hereinafter overtravel toward the right. When the rack 60 moves toward the left a distance greater than that required to move the lug 87 into engagement with the nuts 81, the arm 65 moved by the rack 60 will move away from the bushing 72 as shown in Fig. 11, and will move the nut 78 toward the left further to compress the spring 80. This movement of the rack 60 to move the arm 65 into the position shown in Fig. 11 will be known hereinafter as overtravel of the rack toward the left.

The overtravel of the rack toward the right as shown in Figs. 3, 5 and 9 is used to cause the wire W to be clamped to the slide 61. Referring to Fig. 4, the slide 61 is provided with a groove for receiving a hardened member 90 having a groove 91 for receiving a portion of the wire W. Part 90 is one of the wire clamping members. The other clamping member is a plate 92 also hardened and provided with a groove 93 for receiving a portion of the wire W. Springs 94 in sockets 95 of slide 61 tend to urge the clamping member 92 away from the member 90. The member 92 is moved toward the member 90 by a toggle mechanism comprising a pressure block 96, a toggle link 97, a toggle pin 98, a toggle link 99 and a pressure block 100. These parts are confined between frames 101 and 102 which are attached together by suitable screws and which are mounted upon the slide 61. The relation of the toggle parts to the clamping plate 92 can be adjusted by turning a screw 103 bearing against the block 100. When the desired amount of clamping pressure is obtained when the toggles are straightened, the screw 103 is locked in adjusted position by a nut 104. The top frame 102, Fig. 4, provides a groove for receiving a cam plate 105. (In Figs. 9, 10 and 11, the frame 102 is omitted for sake of clearness). Cam plate 105 is provided with a camming slot 106 for receiving a cam roller 107 journalled on a stud 108 carried by an arm of the toggle link 99.

There is a lost motion connection between the plate 105 and the arm 65; and this connection is provided by the screw stud 69 which is received by an elongated slot 110 in the plate 105. When the rack overtravels the slide 61 toward the left, as shown in Fig. 11, the relative movement between the arm 65 and the slide 61 causes the plate 105 to move into the position shown in Fig. 11, thereby causing the toggle links 97 and 99 to be broken or disaligned, thereby permitting the springs 94 to move the clamping plate 92 from the clamping member 90, thereby unclamping or ungripping the wire W. When the rack 60 overtravels the slide 61 toward the right as viewed in Fig. 9, the plate 105 is moved into the position shown in Fig. 9, due to relative movement of arm 65 toward the right with respect to bracket 75, thereby causing the toggle links 97 and 99 to be aligned to cause the wire W to be clamped between the plates 90 and 92. Thus, when the rack overtravels toward the left as viewed in Fig. 11, the wire is unclamped by the slide; and, when it overtravels toward the right as viewed in Fig. 9, the wire is clamped to the slide. When the slide 61 is moving from the position shown in Fig. 9, toward the left into the position shown in Fig. 11, the toggle links 97 and 99 remain in wire clamping status because, during the return of the arm 65 to normal or mid position shown in Fig. 10, no movement of the cam plate 105 takes place. The screw stud 69 merely moves from the right end of the slot 110 to the left end thereby taking up lost motion between the arm 65 and the plate 105 without producing any motion of the plate 105 toward the left. Therefore, the wire W must remain clamped to the slide 61 during the time the slide is moving from the position shown in Fig. 9 to that position in which the lug 87 (Fig. 5) will engage the left hand pair of nuts 81. Then motion of the wire W toward the left must stop. Overtravel of the rack 60 toward the left will cause the wire to be unclamped from the slide as shown in Fig. 11.

While the wire W is being unclamped from the slide 61 (Fig. 11), the wire is at the same time being clamped to a stationary part of the machine. This is accomplished during movement of the arm 65 toward the left relative to the frame 75 while the latter remains stationary. At the time the lug 87 of the bracket 88 attached to the slide 61 (Fig. 5), begins to engage the left hand pair of nuts 81, the arm 65 begins to engage a left hand portion of nuts 120 adjustably secured to a rod 68, the right end of which is supported by a bearing bushing 112 of the plate 85 and the left end of which is threadedly attached to an arm 113 and is secured thereto in the desired position of adjustment by a nut 114. Arm 113 is attached by screw 115 to a cam bar 116 having a lowland 117 and a highland 118, joined by an inclined cam 119. These surfaces engage a roller 120 trunnioned on a pin 121 carried by a slide 122 for moving a clamping plate 123 toward a fixed clamping plate 124 attached to a block 125 attached to a plate 44 (Fig. 8). While the lowland 117 engages the roller 120, springs 126 in sockets 127 of block 125 move the plate 123 away from the plate 124 in order to release the wire W (Figs. 8 and 10). The cam bar 116 is backed up by a block 130, in turn backed up by a wedge 131. The parts 116—122—123—130—131 are supported between frames 132 and 133 which are attached to the block 125. The wedge 131 is resiliently held in contact with the block 130, and the block 30 with the cam bar 116, by a coiled spring 134 surrounding the stem 135 of the wedge 131 and retained in state of compression by a nut 136 threaded on the lower end of stem 135. Downward movement of wedge 131 is limited by engagement with frame 132 by a screw 141 carried by the head 131a of the wedge. When it is desired to release the wire from engagement by the plate 123, without endwise moving the cam bar 116, the wedge 131 may be lifted by lifting a handle 140 (Fig. 5) pinned at 142 to wedge head 131a and having a fulcrum surface 140a which bears on the top, of frame 132. Guard 140b prevents downward movement of wedge 131 if the lever 140 should be inadvertently pushed downwardly.

When the rack 60 has overtraveled the slide 61 toward the left (Fig. 11), the wire W is clamped between the fixed clamping plates 123 and 124 due to the fact that the high land 118 of the cam bar 116 has engaged the roller 120. At the same time the wire W is unclamped from the slide 61. Therefore, during movement of the slide 61 toward the right the wire W will remain clamped to a fixed support while the feeding mechanism is retracted preparatory to feeding another length of wire. While the rack 60 is overtraveling the slide 61 toward the right, as shown in Fig. 9, the wire W is being clamped to the slide 61 while being released from the clamping action of plates 123 and 124. This release takes effect because, during the overtravel of the rack 60 toward the right, as shown in Fig. 9, the arm 65 has engaged a right hand pair of nuts 150 on the rod 68 and has caused the cam bar 116 to move from the position shown in Fig. 11 to that shown in Fig. 9. Obviously, during movement of the rack 60 from left toward right, and before it begins to overtravel, the cam bar 116 remains in the position shown in Fig. 11 because the arm 65 cannot effect movement of the rod 68 until it strikes the right hand pair of nuts 150 thereon. The wire W remains clamped by the stationary plates 123, 124 until motion of slide 61 toward the right ceases. The wire W is not gripped by the slide 61 because, during motion of the slide 61 from left to right, there is no movement of the plate 125 from the position shown in Fig. 11 to that shown in Fig. 9, since the return of the arm 65 to mid or normal position merely causes the screw stud 69 to move from the left end of slot 110 to the right end, thereby taking up the lost motion between arm 65 and plate 105 without producing any movement of the latter toward the right. After movement of the slide 61 toward the right ceases, during overtravel of the rack 60 toward the right, the wire W is released by plates 123, 124 and is clamped to the slide 61 while the latter is stationary.

While the slide 61 is moving from right toward the left, the wire W remains clamped to the slide while it is unclamped at the stationary plates 123, 124. After movement of the slide 61 toward the left ceases, during overtravel of the rack 60 toward the left, the wire W is released from the slide 61 while the slide is stationary and the wire is clamped between the fixed plates 123 and 124 while the wire is still stationary.

It is apparent from the foregoing that there cannot be any movement of the wire W after the slide 61 stops at the end of its movement toward the left. Likewise there can be no movement of the wire W while the slide 61 is moving toward the right. During the period of overtravel of the rack 60 toward the right, the slide 61 is stationary while the wire is being clamped thereon and while the wire is being released from the plates 123 and 124. There cannot be any movement of the wire toward the wire forming dies except when it is moved from the slide 61. There cannot be any endwise movement of the wire relative to the dies while the slide feed is retracting.

Following the clamping of the wire at the plates 123 and 124 and during the retraction of the slide 61 the wire is severed at a predetermined place and is formed into a hairpin.

*Wire severing mechanism*

The wire severing mechanism will now be described with reference to Figs. 12 and 19 and Fig. 1.

By means of a cam operated device operated by crank shaft 21 the machine causes the intermittent reciprocation of a rod 160 shown in Figs. 1, 12, 13 and 14. Rod 160 is secured to clevis 161 connected by pin 162 with toggle links 163 and 164 connected, respectively, by pins 165 and 166 with blocks 167 and 168, respectively. Blocks 167 and 168 are supported for vertical movement by a frame 170 which is pivotally mounted at its upper end upon a pivot stud 171 attached to a frame part 172 which appears in Fig. 1 near the arrow 12. The frame 170 is yieldably urged against the bracket 172 and a portion of the press frame 20 by flexible spring washers 173 and 174 (Fig. 12) which are maintained in a state of stress against plates 175 and 176, respectively, attached to frame 170. The washers 173 and 174 are located around threaded studs 177 and 178, respectively, secured to frame 20 and cooperating with pairs of nuts 179 and 180, respectively, which are adjusted so as to stress the washers 173 and 174. By reference to Fig. 13 it will be seen that the studs 177 and 178 pass through arcuate slots 177a located in plates 175 and 176 respectively, and having centers of curvature at the center of the stud 171. Studs 177 and 178 pass through extra large holes 177b and 178b in frame 170.

The block 167 (Fig. 14) is retained in the desired position of vertical adjustment by a set screw 181 locked by a nut 182, and also by a screw 183 passing through an elongated slot 184 in block 167 and threaded into the frame 170. The block 168 is guided by ways 185 and 186 provided by frame 170. Block 168 supports an upper punch 190 having an X-shaped cutting surface as viewed in Fig. 17 for cooperating with a similarly X-shaped cutting surface provided at the upper end of a lower punch 191. The punch 191 is mounted in frame 170 and may be adjusted vertically by turning a screw 195. A frame 192 is horizontally adjustably supported upon frame 170 by screws 193 passing through slots 194 in frame 192 and threaded into frame 170. The frame 192 supports a pair of vertically disposed rollers 196 between which the wire W passes. The frame 170 supports a pressure pad 200 having a groove for receiving the wire 100 and having a stem 201 extending through the frame 170 and having its lower end engaged by compression spring 202 which urges the pad 200 upwardly until a cross pin 203 passing through the stem 201 engages an under surface of the frame 170.

When the rod 160 is moved toward the left into the position shown in Fig. 14, the punch 190 will be lifted above the punch 191 as shown in Fig. 15. When the rod 160 is moved toward the right in Fig. 14 the punch 190 will be moved downwardly into the position shown in Fig. 16 in order to sever the wire W and to provide the severed end portions of the wire with pointed bevel edges as shown in Fig. 19a. This construction is advantageous when assembling the hair pins with an armature since it facilitates the entry of the pointed bevel ends of the hairpin legs into the insulated armature core slots. During the downward movement of the punch 190 to shear the wire W, the wire W moves downwardly carrying the pad 200 with it. After the wire is severed in the manner described, punch 190 moves upwardly and the pad 200 also moves upwardly to elevate the severed right hand end of the wire W (Fig. 16) above the lower punch 191. This is necessary in order that, during the next feeding movement of the wire W toward the left, the left end of the wire W will not strike the punch 191.

During the severing of the wire W by the punches 190 and 191, the wire is being clamped by the members 123 and 124 which are represented diagrammatically in Figs. 15 and 16 by the dot-dash rectangles. Attention is directed to the fact that the cutting edges of the star-shaped punch ends slope at 45° away from a horizontal plane. Therefore during the punching operation the material of the wire W will be caused to flow in either direction laterally of the punches; therefore that portion of the wire located between the punches and the clamping members 123 and 124 tends to increase in length during the severing operation. If the distance between the clamping members 123 and 124 and the punches remained fixed during the wire severing operation, the wire would buckle. To prevent buckling of the wire we have provided for movement of the punches 190 and 191 automatically away from the clamping members 123, 124. By comparing Fig. 15 with Fig. 16 it will be seen that, when the punches 190 and 191 are in position for severing the wire W as shown in Fig. 16, they will be further away from the clamping members 123, 124 than when the punches 190—191 are separated as shown in Fig. 15. The movement of the punches in this manner is provided by supporting the punch operating mechanism on the swinging frame 170 and by providing the head of the pin 166 with an elongation 166a for engaging an inclined cam 210 of a plate 211 attached to a frame 212 by screws 211a passing through elongated holes 211b in bracket 212 and threaded into plate 211, thus providing vertical adjustment. Frame 212 is horizontally adjustably secured to a plate 215 by screws 213 passing through elongated holes 214 in frame 212 and threaded into plate 215. Plate 215 is supported by machine frame 20.

It will be seen that, while downward movement of the toggle pin 166 is causing downward movement of the punch 191, the head 166a of the pin will move along plate 211; and that, by the time the punch 190 has forced the wire W against the punch 191 and the severing action begins to take place, the pin head 166a will have engaged the cam 210. Therefore, while the material of the wire W is being displaced to sever the wire, the frame 170, carrying all of the punch operating mechanism and the punches, is moved toward the left as viewed in Figs. 13 and 15 so that the punches finally arrive at the position shown in Fig. 16. Therefore, the severing of the wire is accomplished without buckling the wire. Altho the wire bends between the punches and the clamping devices 123 and 124 as shown in Fig. 16, when the upper punch is retracted the wire will spring back into a horizontal position. As the punch 190 is elevated, the frame 170 swings to the right in Fig. 13 due to the action of a spring 220 attached to a stud 221 on the bottom of the frame 170, and to a stud 222 attached to the machine frame 20. This movement of the frame 170 is limited by the stop bracket 223 fixed to a stationary part 224 and engaged by the head of a screw 225 threaded through a bar 226 attached to frame 170 and locked in the desired position of horizontal adjustment by nut 227.

*Supply of wire to the hairpin forming machine*

The flat wire or bar stock is wound upon a supply reel 230 (Figs. 1 and 20). The reel 230 has a hollow core through which may be passed a shaft 231 upon the ends of which ball bearings 232 are placed. The shaft with its bearings is supported by brackets 233 carried by a portable frame comprising triangularly shaped end members 234 braced by cross bars 235 and including the vertical bars 236 which also support the brackets 233 and which provide a support for a tie bar 237 serving as a means by which the frame may be lifted. The triangular parts 234 rest upon trunnion blocks 238 supported on trunnions 239 which engage track rails 240. The weight of the reel and its supporting frame aside from the weight of the wire W wound thereon is sufficient, while the wire is being unwound, to maintain the reel 230 in a stationary position with the trunnions upon the track rails 240.

The wire is unwound from the reel 230 by geared feed rolls driven by the punch press crank shaft 21. Referring to Fig. 1 it will be seen that the shaft 21 drives a chain 250 passing around a sprocket 251 which drives a shaft 252 coupled at 253 (Figs. 1 and 2) with a shaft 254 (Figs. 2 and 25). Shaft 254 is journalled in bearings 255 and 256 mounted, respectively, in plates 257 and 258 supported, respectively, on pedestal 259 and plate 260. The plate 260 is supported by a frame 261. Endwise movement of the shaft 254 is prevented by securing to the shaft two collars 262 and 263 by pins 264 and 265, respectively. Between the collars and the adjacent frame are located thrust washers 266 and 267.

Intermediate the bearings 255 and 256 the shaft 254 is pinned at 270 to a tube 271 over which slides a sleeve 272 having flanges 273 defining a groove 274 for receiving rollers 275 mounted on pins 276 carried by the bifurcations 277 of a lever 278 fixed to a shaft 279 which is journalled in the back wall 280 which is fixed to the end walls or plates 257 and 258. The lever 278 is moved by electrical means to be described later. When it is in the position shown in Fig. 25 the sleeve 272 has cammed apart two set screws 281 and carried by bell crank levers 282 and located in the desired position of adjustment by lock nuts 283. The levers 282 have arms 284 which have been forced against the left end of the tube 271 which act as a fulcrum, thereby causing the pin supports 285 of levers 282 to be forced toward the left thereby causing clutch plate 287 (carrying pairs of ears 286 for supporting said pins 285) to be urged against a clutch plate 288 carrying a bushing 288x loosely journalled on the shaft 254. The clutch plate 287 is keyed at 287x to the shaft 254; therefore when the lever 278 stands in the position shown in Fig. 25, clutch plate 288 will be connected with shaft 254. Clutch plate 288 provides a gear 290 meshing with a gear 291 pinned at 292 to a counter shaft 293 journalled in bearings 294 and 295 mounted respectively in plates 257 and 258.

When the lever 278 is moved counter-clockwise the clutch plate 287 will be released from driving engagement with the clutch plate 288 through the action of springs 299; and clutch plate 287a will be caused to engage the clutch plate 288a through a mechanism identical with that described with respect to clutch plate 287. The parts associated with clutch plates 287a and 288a are marked with the same reference numerals as the corresponding parts associated with clutch plates 287 and 288, but with the affix a. Clutch plate 288a provides a gear 290a meshing with a gear 291a pinned at 292a to shaft 293. The gear ratio between gears 290 and 291 is slightly greater than 1:1, and the gear ratio between gears 290a and 291a is slightly less than 1:1. The speed of shaft 253 is such that the wire W will be unwound from the reel 230 at the correct average linear speed for consumption by the hairpin forming machine. For example, gears 290—291 provide a drive 2% in excess of average, and gears 290a—291a provide a drive 2% less than average. In order to allow for slight variations in the operation of the unwinding of the wire relative to the consumption of the wire, we have provided for automatically increasing the linear speed of the wire as it is unwound when unwinding tends to lag behind the rate of consumption by the forming press, and for automatically decreasing the linear unwinding speed when the unwinding of wire proceeds at a rate faster than the rate of consumption of the wire by the forming press. When the speed of unwinding wire from the supply reel starts to lag behind the rate of consumption, then the gears 290 and 291 are automatically connected by means to be described later; and, when the rate of unwinding of wire from the reel tends to be faster than the rate of consumption, then the gears 290a and 291a are connected, the other set of gears being disconnected. In this way the shaft 293 is driven at a speed which will vary within certain narrow limits, depending on whether the wire is being unwound from the supply reel too slow or too fast a rate as compared with the rate of consumption by the hairpin forming press.

The shaft 293 has an extension 293a within gear box 300 (supported by plate 260) and carrying a bevel gear 301 pinned to part 293a by pin 302 and meshing with a bevel gear 303 driving a cross shaft 304 (Fig. 24) which is journalled in bearings 305 and 306 provided by frame 307 integral with a base 307a, which is integral with the gear box 300. Shaft 304 drives a lower feed roller 308 and a gear 309 meshing with a gear 310 for driving a shaft 311 which drives an upper feed roller 312. Shaft 311 is journalled in bearing blocks 313 slidable between ways 314 provided by frame 307. These way portions support top bars 315 screwed to the upper end of the ways 314. Through the bars 315 there extend rods 316 which are pinned to bearing blocks 313. The upper roller 312 is forced into engagement with the wire W and to force the latter into engagement with the lower feed roller 308, by the force of gravity acting upon shaft 311 and all of the parts supported by this shaft.

As shown in Fig. 20 there are three pairs of gear feed wheels, namely the wheels 308 and 311 which have been described with reference to Fig. 24, and also two other pairs of these wheels which are mounted on shafts 311a and 304a geared together by gears 310a and 309a. The gears 309a are geared together by an idler pinion 319. The gear 309 and the gear 309a nearest thereto are geared together by an idler pin 320; therefore the shaft 304 drives the shaft 304a and the shafts 311a and the feed rollers driven by these shafts. Shafts 304a and 311a are supported by frame plates 317 attached to frame 307.

When it is desired to release the wire W from engagement with the feed rollers 312 the bearing blocks 313 and 313a are elevated by a mechanism comprising cam plates 321 attached by pins 322 to the rods 316 and connected by cross pins 323 with a link 324 provided with a handle 325. When the links 321 are vertical or inclined toward the right as viewed in Fig. 20, the lower ends of the bars 321 will clear the top of plates 315, thereby releasing the mass supported by the shafts 311 and 311a in order to urge the rollers 312 downwardly. When the handle 325 is moved toward the left in Fig. 20, all of the cam plates 321 rotate counter-clockwise to cause their camming surfaces 321a each to engage the top of a bar 315 and to cause the pivot pins 322 to be elevated above the bars 315, thereby moving the shaft bearing blocks 313 upwardly against the action of gravity.

After the wire passes the power-driven feed rollers, it passes around a wire tensioning guide wheel 330 (Figs. 2 and 21) which is supported by the upper end of a lever 331 comprising two channel bars spaced in parallelism by ties 331a. Lever 331 is attached at its lower end to a tubular hub 332 journalled on a shaft 333 supported by brackets 334 (Fig. 22). In order that the wire may be kept taut, the arm 331 is urged counter-clockwise (Fig. 21), by springs 340 each attached at its lower end to a stud 341 attached to an arm 342 welded to hub 332 and each attached at its upper end to a stud 343 supported by the upper end of a bracket 344 attached at its lower end by screw 345 to a base 346. It will be seen that the springs 340 urge the arm 331 counter-clockwise and resist clockwise movement thereof as viewed in Fig. 21. These springs therefore tend to maintain a certain amount of pressure by the wheel 330 upon the wire, tending to keep the wire taut. As the wire is somewhat stiff, it is not intended that the pressure shall be so great as to pull the wire perfectly straight. The wire may have some slight bends in it as shown in Fig. 2 and these bends will be eliminated by the rollers 50 and 49 of the wire straightening device shown in Fig. 20. However, it is not desirable that there be too much slack or too little slack in the wire between the wire unreeling feed rolls and the wire straightening rolls. Therefore we provide for a control of the gearing between shafts 254 and 293 in accordance with movements of the arm 331 in either direction beyond certain tolerable limits. For this purpose we provide an electric switch 360 which is controlled by a rocking arm 350 (Figs. 21 and 23) having a hub 351 pivoted on a stud 352 fixed to a plate 353. Arm 350 carries a stud 354 to which the lower end of a spring 355 is attached. This spring is attached at its upper end to a stud 356 fixed to the arm 331 near its upper end. When the arm 331 is in a mid-position shown in Fig. 21, the arm 331, the spring 355 and the switch operating arm 350 will be in alignment. A slight movement of the arm 331 in either direction will cause the center line of action of the spring 355 to shift to either side of the pivot point of the arm 350, thereby causing the arm 350 to move in one direction or the other abruptly against one or the other of two stop screws 357 threaded through lugs 358 provided by the plate 353, which plate is attached to the base plate 346. In this way the arm 350 is caused to actuate a movable contact of the two-way switch 360. The switch 360 is attached to the plate 363 and is provided with an operating shaft 361 connected with an operating lever 362 having a stud 363 received by the bifurcated lower end 364 of the lever 350. Through the use of electrical means to be described, the closing of either of two circuits through the switch 360 causes a movement of the lever 278 (Fig. 25) in one direction or the other depending on which of the two circuits is closed.

If an abnormal condition should arise whereby the rate of consumption by the press greatly exceeds that of the rate of unreeling said wire from the reel, then the arm 330 would move clockwise as viewed in Fig. 21 much further than that required to effect a change of gearing of the feed rolls by the switch 360. If such abnormal condition should exist, it is desirable that the hairpin forming machine be stopped automatically. This is accomplished by the opening of a switch 380 having an operating member 381 located in the path of movement of the screw 382 adjustably supported by an arm 383 welded to the hub 332 which carries the lever 331. The screw 382 is secured in the desired position of adjustment relative to the arm 383 by lock nut 384. Movement of the lever 331 clockwise is limited by the striking of a stop lug 385 against the base 346. Similarly if the rate of feed of wire from the supply reel 330 greatly exceeds the rate of consumption by the hairpin forming press, due to failure of its feed mechanism for example, then the slack in the wire would become excessive. Under such abnormal circumstances the operation of the forming press should be discontinued. When the slack in the wire becomes excessive there will be abnormal movement of the arm 331 counter-clockwise (Fig. 21) under the influence of springs 340. This counter-clockwise movement will continue until an arm 390 also welded to the hub 332 strikes the base 346. Just before this occurs, a lug 391 welded to the arm 390 will strike the roller 392 of a limit switch 395 and cause rotation of its operating shaft 396 to open a circuit for the purpose of stopping operation of the hairpin forming press, as will be explained in connection with Fig. 26. Switch 395 is mounted on a plate 393 attached to the base 346.

*System of control*

In Fig. 26, the hairpin forming press is represented by rectangle 400. The hairpins H are discharged yokes downward; and they descend upon a chute and are then conveyed by a chain conveyor 402 carrying pegs 403 which pick up the hairpins by their yokes and drop them, legs down upon a chute 404 associated with the magazine of a machine for assembling the hairpins with an armature core. One such machine is shown in the copending application of Poole and Fausset, Serial No. 366,456, filed Nov. 20, 1940.

The chute 404 has a window 405 through which shine the rays 406 directed by a reflector 408 from a lamp 407 upon a photo-electric cell 409 in circuit with a relay magnet coil 410 having an armature 411 urged counter-clockwise by a spring 412 so that a contact 413 on the armature 411 normally engages a contact 414 in order, normally, to connect a solenoid coil 415 with line-wires 416 and 417 connected with a current source by a switch 418.

When no light shines upon cell 409, coil 415 is energized to cause armature 420 to be attracted toward it to cause a valve 421 to be conditioned for connecting a source of fluid pressure with the upper end of pressure cylinder 422 to cause piston 423 to move to down position as shown. In this position of piston 423, the mechanism (rod 424, bell crank 425, link 426 and arm 427) which controls the press clutch 23 will be in status for causing the power drive (shaft 22x in Fig. 26 or flywheel 22 in Fig. 1) to be disconnected from the press crank shaft.

When light from lamp 407 shines upon cell 409, relay coil 410 is energized to cause separation of contacts 413 and 414 and engagement of contacts 430 and 431 to cause solenoid 415 to be inactive and solenoid 432 to be active whereby the armature will be attracted toward it to condition valve 421 for admission of fluid pressure into the lower end of cylinder 422 and the venting of the upper end. Then the piston 423 will move upwardly and the clutch 23 will be caused to connect power shaft 22x with the press crank shaft.

It is apparent that the press will cease operating whenever light fails to shine upon cell 409. If window 405 of chute 404 is blocked by the legs of accumulated hairpins the press will stop. If the lamp 407 does not burn, the press will stop. Lamp 407 may be turned off manually by opening snap switch 435 or line switch 418, or automatically by the opening of switch 380 or of switch 395 in case of abnormal movement of wheel 330, or automatically by the separation of contacts of a switch 440 effected by the buckling of the wire W between the straightening rolls 49, 50 and the wire feeding device of the press.

The lamp 407 is across lines 416—417 and in series with snap switch 435, contacts 461—463 of relay 460, and contacts 481—482 of start switch 480. Magnet coil 465 of relay 460 is across line 416—417 and in series with contacts 481—482 of a start switch 480, contacts 471—472—473 of a stop switch 470, contacts 441—442—443 of wire-buckling-responsive switch 440, contacts 397—398 of switch 395 and contacts 387—388 of switch 380. By closing switch 480, coil 465 of relay 460 is energized to cause contacts 461 and 462 to engage contacts 463 and 464, thereby causing lamp 407 to burn and the circuit of coil 465 to be established independently of start switch 480. Pressure on button 483 of switch 480 may then be released to allow this switch to open by spring 484. Relay coil 465 remains energized so long as switches 470, 440, 395 and 380 are all closed. If any one of these switches are opened, the relay coil 465 will be deenergized, the contacts 461 and 462 will separate from the contacts 463 and 464, the lamp 407 will cease to burn and the press 400 will stop. The press 400 may be stopped manually by pressing upon the stop switch 470 or automatically in response to abnormal movement of wire tensioning arm 337, or by buckling of the wire between the straightening rolls and the press feed device. The buckling of the wire W will cause an eyelet 444 (thru which wire W passes) balanced between springs 445 to raise or lower a rod 446 to cause a block to raise contact arm 441a or to lower contact arm 443a, and then to open switch 440.

The arm 278 for shifting the clutch controlling sleeve 272 is moved by either of two solenoids 500 and 501 having armatures 500a and 501a, respectively, having pushers 500b and 501b, respectively, for engaging the upper end of arm 278. Solenoids 500 and 501 are controlled, respectively, by relays 502 and 503, respectively, having pairs of contacts 502 and 503, respectively, which, when closed, will establish the solenoid circuit. The magnet coils 500c and 501c of solenoids 500 and 501, respectively, are connected in series with switches 500d and 501d, respectively. Relay coil 502c is in series with contacts 370—371 of contact 360. Relay coil 503c is in series with contacts 367—368 of switch 360. The contact carrier 362 of switch 360 carries contacts 368 and 371 and is connected with line wire 417.

Previous to the condition shown in Fig. 26, contacts 370 and 371 of switch 360 had been closed, relay 502 had been energized and solenoid 500 had been active to push lever 278 clockwise to establish the gearing of ratio 1:1 plus. This ratio of gearing will tend to feed the wire from the supply reel at a rate slightly in excess of the rate of consumption by the hairpin press. The slack in the wire passing around wheel 330 will gradually increase. Finally the arm 337 will swing to the position shown in Fig. 26, to cause the opening of contacts 370—371 and the closing of contacts 367, 368. Then relay coil 503c will be energized, contacts 503a and 503b will close, and solenoid 501 will be active to push arm 278 counter-clockwise to change the gear ratio from 1:1 plus to 1:1 minus, arm 278b of lever 278 will open switch 501d to open circuit solenoid 501c to render solenoid 501 inactive so that its armature 501b will be returned by the spring 501c. Arm 278a will release switch 500d to permit it to close.

As the slack in the wire W diminishes, the lever 337 swings counter-clockwise in Fig. 26 to effect separation of contacts 367 and 368 and the closing of contacts 370 and 371. Then relay 503 is inactive and relay 502 is active; and solenoid 500 is connected with the line by the closing of contacts 502a and 502b. Armature 500a is attracted toward the right and lever 278 is returned to the position shown in Fig. 26. Arm 278a opens switch 500d to open circuit solenoid coil 500c; and spring 500c returns armature 500a to normal position. Arm 278b releases switch 501d to permit it to close so that the solenoid coil 501c will be energized when relay 503 is energized again in response to the closing of switch contacts 367 and 368.

While the embodiment of the present invention as herein disclosed, constitutes a preferred form, it is to be understood that other forms might be adopted, all coming within the scope of the claims which follow.

What is claimed is as follows:

1. Apparatus for feeding wire to a forming machine comprising the combination of a reciprocating slide provided with means for clamping the wire thereto, stops determining the travel of the slide, a reciprocating member operated by the machine through a distance exceeding the travel of the slide, means yieldably connecting the member and slide so that the member may overtravel the slide in either direction of movement, means actuated by the overtravel of the member with respect to the slide for operating the wire clamping means of the slide, means for clamping the wire to a stationary part, and means actuated by the overtravel of the member with respect to the slide for moving the last named clamping means into wire-clamping status while the clamping means of the slide is moved into wire-releasing status, and vice versa.

2. Apparatus according to claim 1 in which the wire clamping means of the slide includes a movable clamping plate, a toggle mechanism for moving the plate relative to the slide and laterally of the wire, and a cam plate articulated with the toggle mechanism and mounted upon the slide for movement parallel to the movement of the reciprocating member, and means providing a lost motion connection between the member and cam plate whereby the cam plate is moved by the member only when the member over-travels the slide in either direction.

3. Apparatus according to claim 1 in which the means for actuating the means for clamping the wire against a stationary part includes a bar movable parallel to the reciprocating member, parts carried by the bar, and a part moving with the reciprocating member, said parts carried by bar being located in the path of movement of the part moving with the reciprocating member.

4. Apparatus according to claim 1 and including spaced apertured ears provided by the slide, flanged bushings each received by an apertured ear, the bushings being located in alignment and parallel to the movement of the reciprocating member, the flanges of the bushings being located against the remote side of the ears of the slide, and including a rod extending thru the bushings, and including nuts each spaced from a bushing and carried on an end of the rod, and including two coiled springs each surrounding the rod and maintained under compression between a nut and the nearest bushing, and including a device located between the bushings for connecting the reciprocating member with the rod, and in which the mechanisms respectively for clamping the wire to the slide and to a stationary part are operated in response to the over-travel of the device with respect to the slide.

5. Apparatus for feeding wire to a forming machine and for cutting the wire into required lengths before forming, comprising the combination of intermittently operating apparatus for feeding wire toward the forming dies, said apparatus providing for holding the wire stationary after being fed, means located between the forming dies and the feeding apparatus for deforming the wire to sever it and to provide the severed portions with pointed ends, said deforming means causing the material of the wire to flow and to increase the normal distance between the feeding apparatus and the portion of the wire where deformation starts, and means responsive to operation of the deforming means for causing the deforming means to move bodily in the direction of travel of the wire a distance commensurate with said increase in length of the wire, whereby buckling of the wire is avoided during deformation thereof.

6. Apparatus according to claim 5 and including a frame movable relative to the wire feeding apparatus in the direction of travel of the wire, and upon which the wire deforming means and its operating mechanism are mounted, said frame being moved away from the wire feeding apparatus by means responsive to the operation of the deforming means.

7. Apparatus for feeding wire to a forming machine comprising, in combination, means for supporting a wire supply reel, power driven feed rollers for unreeling wire from the reel, a wire-tensioning guide wheel around which the wire passes while traveling from the feed rollers to the machine, a movable frame supporting the wheel, means urging the wheel away from the machine to take up the slack in the wire, a shaft driven by the machine, separate gear trains for connecting the shaft with the feed rollers, one train providing a feed roller speed slightly in excess of the rate of press consumption and the other train providing a speed slightly less than the rate of press consumption, and automatic means for selecting either of said gear trains dependent upon movement of the tension wheel frame in either direction beyond certain limits.

8. Apparatus according to claim 7 and including clutches by means of which the gear trains are selectively connected with the press operated shaft, and including a control member movable in either of two directions and by means of which the clutches are selectively closed, the control member being moved in these directions selectively in response to movement of the tension wheel frame in either of two directions beyond certain limits.

9. Apparatus according to claim 7 and including clutches by means of which the gear trains are selectively connected with the press operated shaft, and including a control member for selectively closing the clutches by movement of the control member in either of two directions and including solenoids respectively for moving the control member in said two directions and including two switches respectively controlling the energization of the solenoids, said switches being closed, respectively, in response to movements of the tension wheel frame beyond certain limits.

10. Apparatus according to claim 7 in combination with means for automatically causing the machine to stop in response to abnormal movements of the tension wheel frame in either direction.

11. Apparatus according to claim 7 in combination with means for automatically causing the machine to stop in response to buckling of the wire as it passes to the forming machine.

12. Apparatus according to claim 7 in combination with means for automatically causing the machine to stop in response to buckling of the wire as it passes to the forming machine or in response to abnormal movements of the tension wheel frame in either direction.

13. Apparatus for controlling the operation of a wire forming machine comprising, in combination, means for conveying formed-wire articles from the machine, a magazine having a chute upon which the articles are deposited by the conveyor and along which the articles gravitate enroute to the magazine outlet, said chute having an aperture blocked by the articles when a number of them have accumulated, a photo-electric cell adjacent one end of the aperture, an electric lamp adjacent the other end of the aperture and projecting rays through the aperture upon the cell, means responsive to activity of the cell for causing the forming machine to operate, and means for controlling operation of the lamp in response to a condition of the wire before it passes to the wire forming machine in order to start or to stop the machine.

14. Apparatus according to claim 13, in which the lamp is rendered non-operative in response to buckling of the wire as it passes to the forming machine.

15. Apparatus according to claim 13, in which the lamp is rendered non-operative in response to the amount of slack in the wire between the machine and its associated supply reel becoming either abnormally too great or too little.

CHARLES A. NICHOLS.
ERNEST R. FAUSSET.

CERTIFICATE OF CORRECTION.

Patent No. 2,312,845.    March 2, 1943.

CHARLES A. NICHOLS, ET AL.

It is hereby certified that error appears in the printed specification of the above numbered patent requiring correction as follows: Page 2, first column, line 64, for "in" read --of--; second column, line 12, for "with" read --wire--; and that the said Letters Patent should be read with this correction therein that the same may conform to the record of the case in the Patent Office.

Signed and sealed this 8th day of June, A. D. 1943.

(Seal)

Henry Van Arsdale,
Acting Commissioner of Patents.